US011909651B2

(12) United States Patent
Senoo et al.

(10) Patent No.: US 11,909,651 B2
(45) Date of Patent: Feb. 20, 2024

(54) COMMUNICATION SYSTEM, COMMUNICATION APPARATUS AND BANDWIDTH ALLOCATION METHOD

(71) Applicant: NIPPON TELEGRAPH AND TELEPHONE CORPORATION, Tokyo (JP)

(72) Inventors: Yumiko Senoo, Musashino (JP); Takahiro Suzuki, Musashino (JP); Junichi Kani, Musashino (JP); Hirotaka Ujikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 306 days.

(21) Appl. No.: 17/311,950

(22) PCT Filed: Dec. 4, 2019

(86) PCT No.: PCT/JP2019/047388
§ 371 (c)(1),
(2) Date: Jun. 8, 2021

(87) PCT Pub. No.: WO2020/121910
PCT Pub. Date: Jun. 18, 2020

(65) Prior Publication Data
US 2022/0021617 A1    Jan. 20, 2022

(30) Foreign Application Priority Data

Dec. 14, 2018    (JP) ................................. 2018-234812

(51) Int. Cl.
*H04L 47/20* (2022.01)
*H04B 10/27* (2013.01)
(Continued)

(52) U.S. Cl.
CPC ............. *H04L 47/20* (2013.01); *H04B 10/27* (2013.01); *H04L 12/44* (2013.01); *H04L 47/193* (2013.01); *H04L 47/627* (2013.01)

(58) Field of Classification Search
None
See application file for complete search history.

(56) References Cited

U.S. PATENT DOCUMENTS

| 7,076,563 B1* | 7/2006 | Yamanaka | H04L 12/1421 |
| | | | 709/252 |
| 2012/0218892 A1* | 8/2012 | Kotecha | H04L 47/20 |
| | | | 370/235 |

(Continued)

FOREIGN PATENT DOCUMENTS

JP    2017022514 A    *    1/2017

OTHER PUBLICATIONS

IEEE Computer Society, IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications, IEEE Std 802.3ah-2004, Sep. 7, 2004.

*Primary Examiner* — Alter J Divito
(74) *Attorney, Agent, or Firm* — Harness, Dickey & Pierce, P.L.C.

(57) ABSTRACT

A communication system includes a subscriber network unit and a communication device provided in an accommodating station. The subscriber network unit includes an acquisition unit that acquires uplink data from one or more lower-layer devices. The communication device includes: a data processing unit that acquires the uplink data from the subscriber network unit using a band of uplink communication and executes data processing on the acquired uplink data; a policy determination unit that determines a policy of band (Continued)

allocation of the uplink communication on the basis of the result of the data processing; and an allocation control unit that allocates the band of the uplink communication to the subscriber network unit on the basis of the policy.

6 Claims, 10 Drawing Sheets

(51) Int. Cl.
*H04L 12/44* (2006.01)
*H04L 47/193* (2022.01)
*H04L 47/625* (2022.01)

(56) References Cited

U.S. PATENT DOCUMENTS

2013/0318566 A1\* 11/2013 Inoue ................ H04N 21/6106
398/66
2017/0005724 A1\* 1/2017 Nose ....................... H04L 12/44

\* cited by examiner

COMMUNICATION SYSTEM, COMMUNICATION APPARATUS AND BANDWIDTH ALLOCATION METHOD

CROSS-REFERENCE TO RELATED APPLICATIONS

This application is a 371 U.S. National Phase of International Application No. PCT/JP2019/047388 filed on Dec. 4, 2019, which claims priority to Japanese Application No. 2018-234812 filed on Dec. 14, 2018. The entire disclosures of the above applications are incorporated herein by reference.

TECHNICAL FIELD

The present invention relates to a communication system, a communication device, and a band allocation method.

BACKGROUND ART

FTTH (Fiber To The Home) is spreading worldwide in response to the growing need for faster access services. In an FTTH service, in some cases, an OLT (Optical Line Terminal) accommodates a plurality of ONUs (Optical Network Units) by TDM (Time Division Multiplexing).

The FTTH service may be provided by a highly economical PON (Passive Optical Network) method. The main system of FTTH services in Japan is GE-PON (Gigabit Ethernet PON), which can provide gigabit-class transmission speed.

Edge computing is in the spotlight as a method for realizing applications in which image analysis is utilized, autonomous driving, remote control, and the like. In edge computing, an edge server disposed near a device executes data processing on uplink data transmitted from the device. In this way, the edge computing can realize low communication delay and reduction of traffic volume. The use of deploying an edge server in an accommodating station (communication building) has been actively proposed. Since the accommodating stations are deployed in almost every municipality in Japan and have excellent earthquake resistance, the accommodating stations are ideal places for installing edge servers.

FIG. 9 is a diagram illustrating a configuration example of a conventional communication system. The communication system illustrated in FIG. 9 is an optical subscriber communication system as a solution for edge computing. Uplink data including non-structured data such as images, still images, or voices acquired by a lower-layer device such as an IoT (Internet of Things) device is transmitted from an ONU connected to the lower-layer device to an OLT via an optical line. A data processing device (data processing infrastructure) provided in the edge server provided in the accommodation station executes data processing on the uplink data received by the data processing device. The data processing device transmits the uplink data on which data processing has been executed to a higher-layer device (not illustrated) in the cloud connected to the upper layer of the data processing device.

In this manner, the data processing device provided in the accommodating station executes data processing on the uplink data. In this case, when a traffic volume generated by each lower-layer device is B [bps] and two ONUs are connected to one OLT, a total band between the OLT and the ONU is 2B [bps]. Particularly, when an image is transmitted from a lower-layer device, a large-capacity optical line is indispensable since the image generates a large volume of traffic.

In a GE-PON system, a DBA (Dynamic Bandwidth Allocation) function of dynamically allocating the band of uplink communication from an ONU to an OLT according to a traffic volume can be mounted on the OLT. In FIG. 9, an allocation control unit of an OLT 41 executes DBA processing. In GE-PON, an allocation control unit realizes transmission control of uplink data using MPCP (Multi Point Control Protocol). An ONU notifies the OLT of the amount of the uplink data accumulated in a buffer of the ONU using a REPORT frame. The allocation control unit of the OLT instructs each ONU on the transmission start time and the transmission permission amount of the uplink data using a GATE frame so that pieces of uplink data of each ONU do not collide in time.

FIG. 10 is a diagram illustrating an operation example (an uplink communication band allocation operation) of a conventional communication system. An ONU temporarily accumulates received uplink data in a buffer (step S301). The ONU records the amount of the accumulated uplink data in a REPORT frame. The ONU transmits the REPORT frame to an OLT. The OLT extracts information indicating the amount of the uplink data accumulated in the ONU from the REPORT frame received from the ONU (step S302).

The OLT derives the band of uplink communication to be allocated to the ONU having transmitted the REPORT frame on the basis of the amount of the uplink data accumulated in the ONU and the band used by another ONU. That is, the OLT derives the transmission start time and the transmission permission amount of the uplink data of the ONU (step S303). The OLT 41 transmits a GATE frame in which information indicating the derived transmission start time and transmission permission amount is recorded to the ONU 3 having transmitted the REPORT frame (step S304).

The ONU transmits the uplink data to the OLT at the transmission start time instructed using the GATE frame received from the OLT. For next band allocation in the OLT, the ONU may newly notify the OLT of the amount of the uplink data accumulated in a buffer memory of the ONU (step S305).

Since the OLT can grasp the amount of the uplink data accumulated in each ONU by repeating the procedures of steps S301 to S305, it is possible to appropriately allocate the band of uplink communication. Steps S301 to S302 which are procedures for realizing a DBA function and steps S304 to S305 are standardized as MPCP in the standard of IEEE802.3ah. In contrast, a DBA algorithm which is an algorithm for dynamically allocating a band to each ONU 3 is out of the standardization range of the IEEE802.3ah standard (see NPL 1).

CITATION LIST

Non Patent Literature

[NPL 1] IEEE Standard 802.3ah

SUMMARY OF THE INVENTION

Technical Problem

When a lower-layer device is a surveillance camera, for example, the ONU transmits uplink data including a large amount of images to an edge server. The edge server executes data processing on the uplink data in order to analyze the image captured by the lower-layer device. In this case, since a large amount of image traffic is generated in an optical line between the OLT and the ONU, the communication cost is high. In order to prevent a large amount of image traffic from being generated in the optical line, the number of lower-layer devices that can be connected to the ONU may be limited. Such a problem is not limited to a case where the data to be communicated is an image, but is a problem related to all data to be communicated in general. As described above, the conventional communication system has a problem that the increase in the traffic volume cannot be suppressed.

In view of the above circumstances, an object of the present invention is to provide a communication system, a communication device, and a band allocation method capable of suppressing an increase in traffic volume.

Means for Solving the Problem

An aspect of the present invention provides a communication system including a subscriber network unit and a communication device provided in an accommodating station, wherein the subscriber network unit includes: an acquisition unit that acquires uplink data from one or more lower-layer devices, and the communication device includes: a data processing unit that acquires the uplink data from the subscriber network unit using a band of uplink communication and executes data processing on the acquired uplink data; a policy determination unit that determines a policy of band allocation of the uplink communication on the basis of the result of the data processing; and an allocation control unit that allocates the band of the uplink communication to the subscriber network unit on the basis of the policy.

In the communication system of the aspect of the present invention, the uplink data is transmitted via an optical line.

In the communication system of the aspect of the present invention, the uplink data is image data, and the data processing is image analysis processing.

In the communication system of the aspect of the present invention, the allocation control unit allocates the band of the uplink communication to the subscriber network unit on the basis of the policy and an amount of the uplink data accumulated in the subscriber network unit.

In the communication system of the aspect of the present invention, the communication device is a subscriber line terminal.

Another aspect of the present invention provides a communication system including a plurality of medium conversion devices and a communication device provided in an accommodating station, wherein a first medium conversion device acquires uplink data of a first format from one or more lower-layer devices and converts the acquired uplink data of the first format to the uplink data of a second format, and the communication device includes: a second medium conversion device that acquires the uplink data of the second format using a band of uplink communication from the first medium conversion device, converts the acquired uplink data of the second format to the uplink data of a third format, and records the uplink data of the third format to a queue; a data processing unit that executes data processing on the acquired uplink data of the third format; a policy determination unit that determines a policy of band allocation of the uplink communication on the basis of the result of the data processing; and a layer-2 switch that acquires the acquired uplink data of the third format from the queue on the basis of the policy and outputs the uplink data to the data processing unit.

Another aspect of the present invention provides a communication device provided in an accommodating station, including: a data processing unit that acquires uplink data using a band of uplink communication from a subscriber network unit that acquires the uplink data from one or more lower-layer devices and executes data processing on the acquired uplink data; a policy determination unit that determines a policy of band allocation of the uplink communication on the basis of the result of the data processing; and an allocation control unit that allocates the band of the uplink communication to the subscriber network unit on the basis of the policy.

Another aspect of the present invention provides a band allocation method executed by a communication system including a subscriber network unit and a communication device provided in an accommodating station, the band allocation method including: allowing the subscriber network unit to acquire uplink data from one or more lower-layer devices; allowing the communication device to acquire the uplink data from the subscriber network unit using a band of uplink communication and execute data processing on the acquired uplink data; allowing the communication device to determine a policy of band allocation of the uplink communication on the basis of the result of the data processing; and allowing the communication device to allocate the band of the uplink communication to the subscriber network unit on the basis of the policy.

Effects of the Invention

According to the present invention, it is possible to suppress an increase in traffic volume.

DESCRIPTION OF EMBODIMENTS

Embodiments of the present invention will be described in detail with reference to the drawings.

First Embodiment

Figure 1:
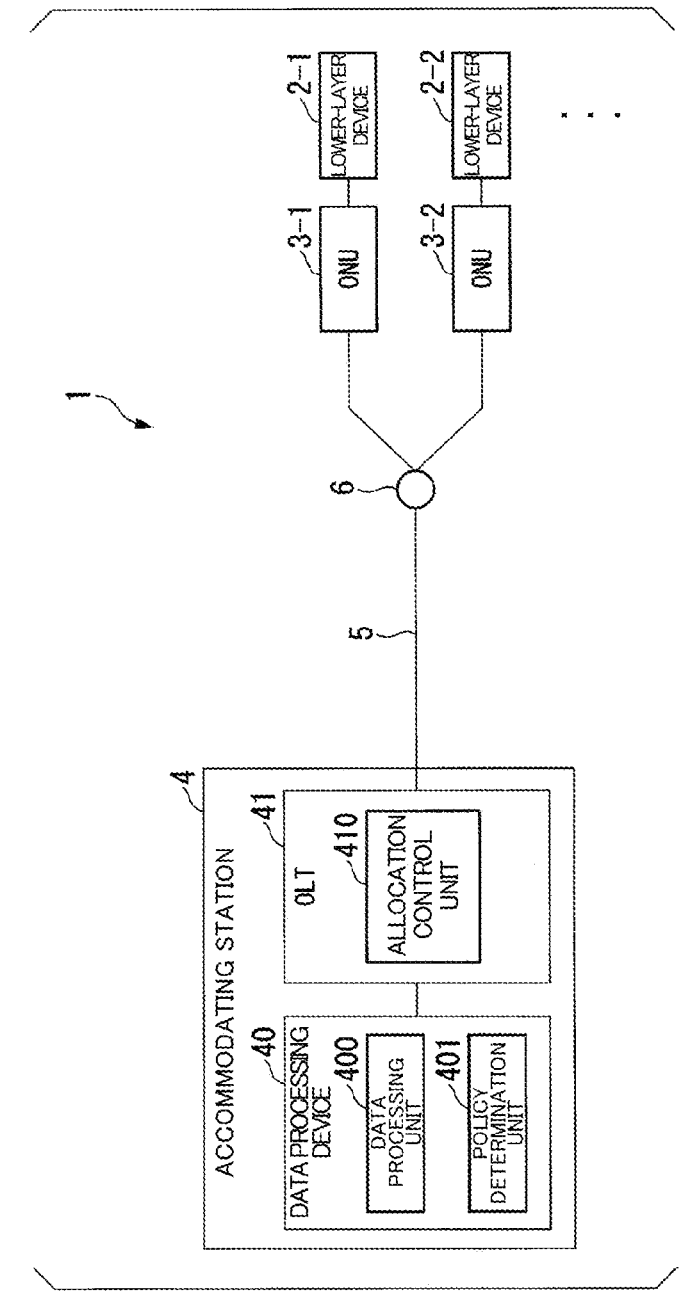
FIG. 1 is a diagram illustrating a configuration example of a communication system according to a first embodiment.

FIG. 1 is a diagram illustrating a configuration example of a communication system 1. The communication system 1 is a system that executes communication. In the following description, the communication system 1 is an optical subscriber communication system as an example of a solution of an edge computing. The communication system 1 includes one or more lower-layer devices 2, one or more ONUs 3, an accommodating station 4, an optical fiber 5, and an optical coupler 6.

A data processing device 40 and an OLT 41 are provided in the accommodating station 4 as one or more station-side communication devices. In this manner, the data processing device 40 is provided near the OLT 41.

The lower-layer device 2 is an IoT device, for example. The IoT device is a surveillance camera, for example. The ONU 3 is a subscriber network unit that executes optical communication. The ONU 3 converts downlink data received from the OLT 41 using an optical signal to a predetermined data format. The ONU 3 transmits the downlink data converted to the predetermined data format to the lower-layer device 2. The ONU 3 converts uplink data received from the lower-layer device 2 to an optical signal. The ONU 3 transmits the uplink data converted to the optical signal to the OLT 41. The optical fiber 5 is a medium (transmission medium) that transmits an optical signal in an optical line. The optical coupler 6 is a device that multiplexes or demultiplexes an optical signal in an optical line.

The data processing device 40 is a server device (edge server) that operates as an edge computer. The data processing device 40 includes a data processing unit 400 and a policy determination unit 401. The data processing unit 400 executes predetermined data processing (primary processing) on the uplink data received from the OLT 41. For example, the data processing unit 400 executes predetermined data processing on uplink data including non-structured data such as moving images, still images, and voices received from the OLT 41. The predetermined data processing is image analysis processing and voice analysis processing, for example. The data processing unit 400 executes image analysis processing such as, for example, a process of detecting a person image included in a captured image, a process of recognizing a person in a person image included in a captured image, a process of detecting a traffic line or a degree of congestion of a person in a captured image, a process of detecting a moving speed of a vehicle in a captured image, and a process of recognizing the type of a vehicle in a captured image. The data processing unit 400 executes voice analysis processing of recognizing a specific word included in a collected voice, for example. The data processing unit 400 executes data processing such as image analysis processing and voice analysis processing on the basis of the result of machine learning, for example. The data processing unit 400 transmits the uplink data on which data processing has been executed to a higher-layer device (not illustrated) in the cloud connected to the higher layer of the data processing device 40.

The policy determination unit 401 determines the policy of band allocation of uplink communication from the ONU 3 to the OLT 41 on the basis of the result of the data processing on the uplink data in the data processing unit 400. The policy determination unit 401 derives a weighting factor for each ONU 3, for example, as the policy of the band allocation of the uplink communication including uplink data and control signals. The policy determination unit 401 notifies the OLT 41 of the policy of the band allocation of the uplink communication. The OLT 41 can adjust the band to the uplink communication to be allocated to each ONU 3 according to the ratio of the weighting factors of each ONU 3.

The OLT 41 is a subscriber line terminal that executes optical communication. The OLT 41 includes an allocation control unit 410. The allocation control unit 410 derives the transmission start time and the transmission permission amount of the uplink data from each ONU 3 to the OLT 41 on the basis of the policy of the band allocation of the uplink communication notified from the policy determination unit 401. The allocation control unit 410 instructs each ONU 3 on the transmission start time and the transmission permission amount of the uplink data using a GATE frame so that pieces of uplink data of each ONU 3 do not collide in time.

When the lower-layer device 2 is a surveillance camera, for example, and the data processing unit 400 has detected a person image in the image captured by the lower-layer device 2, the policy determination unit 401 may increase the band of the uplink communication to be allocated to the ONU 3 of the lower-layer device 2. In contrast, when the data processing unit 400 has not detected a person image in the image captured by the lower-layer device 2, the policy determination unit 401 may decrease the band of the uplink communication to be allocated to the ONU 3 of the lower-layer device 2 on the basis of the result of the data analysis by the data processing unit 400. In this manner, the policy determination unit 401 flexibly changes the band of uplink communication to be allocated to the ONU 3 of the lower-layer device 2 on the basis of the result of the data processing by the data processing unit 400.

In transmission of non-compressed images, the ONU 3 transmits uplink data (packets) indicating non-compressed images to the OLT 41 on the basis of a UDP (User Datagram Protocol), for example. There is a case where a communication speed of uplink data that can be transmitted from the ONU 3 decreases depending on the result of band allocation of the uplink communication by the allocation control unit 410. When a packet loss occurs according to decrease in communication speed of uplink data, block noise may occur in an image. The ONU 3 changes the communication speed of the uplink data between the OLT 41 and the ONU 3 according to the band of the uplink communication allocated by the policy determination unit 401 and the allocation control unit 410. The lower-layer device 2 may change the spatial resolution or temporal resolution of an image to be captured according to the communication speed of the uplink data. In this way, the lower-layer device 2 can change the occurrence rate of block noise.

Figure 2:
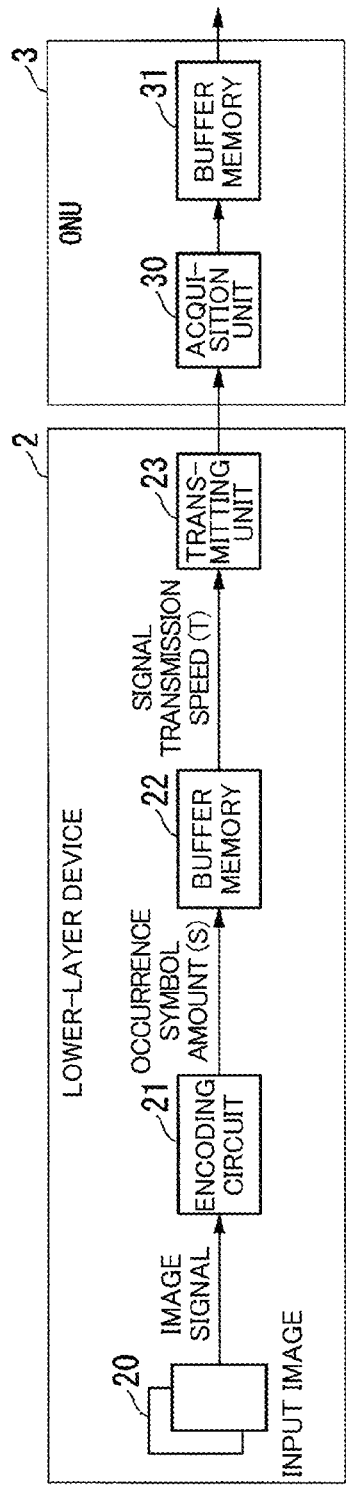
FIG. 2 is a diagram illustrating a configuration example of a lower-layer device and an ONU according to the first embodiment.

FIG. 2 is a diagram illustrating a configuration example of the lower-layer device 2 and the ONU 3. The lower-layer device 2 includes an encoding circuit 21, a buffer memory 22, and a transmitting unit 23. The ONU 3 includes an acquisition unit 30 and a buffer memory 31. In transmission of compressed images, the encoding circuit 21 acquires an image signal indicating an input image 20. The encoding circuit 21 generates a compressed image by encoding the input image 20. The buffer memory 22 temporarily accumulates the generated compressed image.

The transmitting unit 23 transmits the compressed images to the OLT 41 in the order of accumulation in the buffer memory 22.

The compressed image stored in the buffer memory 31 is transmitted to the OLT 41 via an optical line including the optical fiber 5 and the optical coupler 6 on the basis of the GATE frame received from the OLT 41 in the ONU 3. For example, when the lower-layer device 2 and the ONU 3 are connected by a full-duplex Ethernet (registered trademark) and the compressed image exceeds the capacity of the buffer memory 31, the ONU 3 executes congestion control with respect to the full-duplex Ethernet (registered trademark) using a pause frame defined in IEEE802.3x.

The lower-layer device 2 having received a pause frame stops transmission of a compressed image in a period recorded in the pause frame. For example, when the band of the uplink communication allocated to the ONU 3 decreases, the communication speed of the compressed image generated by the lower-layer device 2 exceeds the communication speed of uplink data, and an amount of compressed images exceeding the capacity of the buffer memory 31 are generated, the transmitting unit 23 stops transmission of compressed images on the basis of the pause frame.

When an amount of compressed images exceeding the capacity of the buffer memory 22 are generated due to stopping of the transmission of compressed images, the buffer memory 22 discards a portion of the compressed images due to occurrence of an overflow. In order to prevent the occurrence of an overflow, the encoding circuit 21 executes encoding control of monitoring a data amount of the compressed images accumulated in the buffer memory 22 and suppressing an occurrence amount of compressed images on the basis of a threshold set for each data amount of compressed images. For example, the encoding circuit 21 decreases the number of bits indicating a coefficient value of DCT (Discrete Cosine Transform) so that quantization characteristics of images are coarse. The encoding circuit 21 may decrease the number of frames of the input image 20. In this way, the lower-layer device 2 can change the spatial resolution or the temporal resolution of compressed images. Such encoding control is implemented in the lower-layer device 2 on the basis of MPEG (Moving Picture Experts Group) standards, for example.

The ONU 3 changes the communication speed of the uplink data between the OLT 41 and the ONU 3 according to the results of the band allocation of the uplink communication by the policy determination unit 401 and the allocation control unit 410. The acquisition unit 30 acquires the compressed images from the transmitting unit 23. The buffer memory 31 temporarily accumulates the acquired compressed images.

Figure 3:
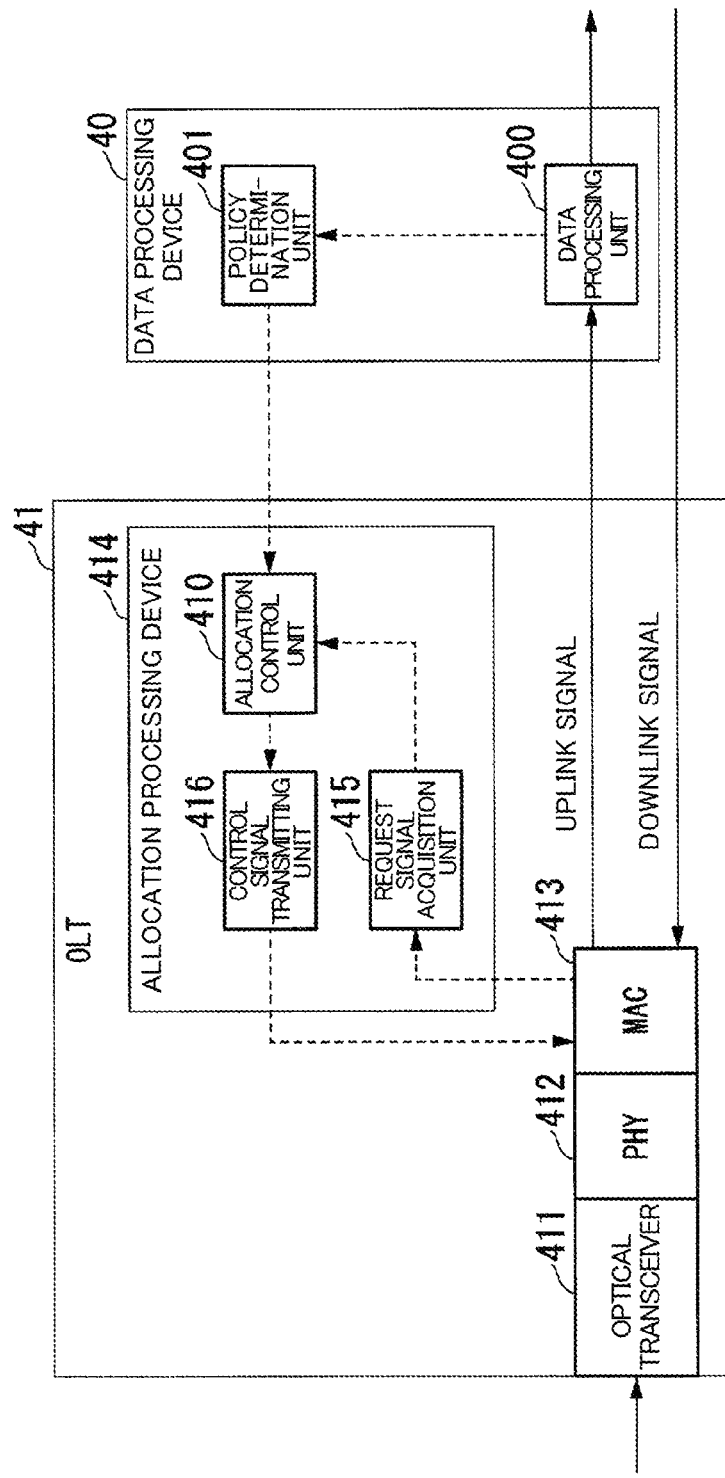
FIG. 3 is a diagram illustrating a configuration example of a data processing device and an OLT according to the first embodiment.

FIG. 3 is a diagram illustrating a configuration example of the data processing device 40 and the OLT 41 (a device in an accommodating station building). The OLT 41 includes an optical transceiver 411, a PHY 412, an MAC 413, and an allocation processing device 414. The allocation processing device 414 includes an allocation control unit 410, a request signal acquisition unit 415, and a control signal transmitting unit 416. Some or all of the functional units of the data processing device 40 and the OLT 41 are realized using hardware such as LSI (Large Scale Integration) or ASIC (Application Specific Integrated Circuit), for example.

The optical transceiver 411 outputs the uplink data received from the ONU 3 to the PHY 412. The optical transceiver 411 transmits downlink data to the ONU 3. The PHY 412 (PHYsical sublayer) is a functional unit of a physical layer. The MAC 413 (Media Access Control) is a functional unit of a data link sublayer.

The data processing unit 400 executes predetermined data processing on the uplink data received from the ONU 3. The uplink data may include unstructured data such as moving images, still images, or voices, for example. The policy determination unit 401 determines the policy of band allocation of the uplink communication to be allocated to each ONU 3 on the basis of the result of the data processing on the uplink data in the data processing unit 400.

The request signal acquisition unit 415 acquires a REPORT frame (request signal) from the MAC 413. The allocation control unit 410 acquires information indicating the amount of the uplink data accumulated in the ONU 3 and information indicating the band used by another ONU 3 from the MAC 413.

The allocation control unit 410 acquires information indicating the determined policy of band allocation of the uplink communication from the policy determination unit 401.

The allocation control unit 410 dynamically allocates the band of the uplink communication to each ONU 3 on the basis of the policy of band allocation of the uplink communication. The allocation control unit 410 derives the band of uplink communication to be allocated to the ONU 3 having transmitted the REPORT frame. For example, the allocation control unit 410 derives the transmission start time and the transmission permission amount of the uplink data from each ONU 3 to the OLT 41 on the basis of the policy of the band allocation of the uplink communication notified from the policy determination unit 401.

The allocation control unit 410 outputs a GATE frame including information indicating the derived band of the uplink communication to the control signal transmitting unit 416. The control signal transmitting unit 416 outputs the GATE frame to the MAC 413. The MAC 413 outputs the GATE frame to the PHY 412. The PHY 412 outputs the GATE frame to the optical transceiver 411. The optical transceiver 411 transmits the GATE frame to the ONU 3 having transmitted the REPORT frame.

Next, an operation example of the communication system 1 will be described.

Figure 4:
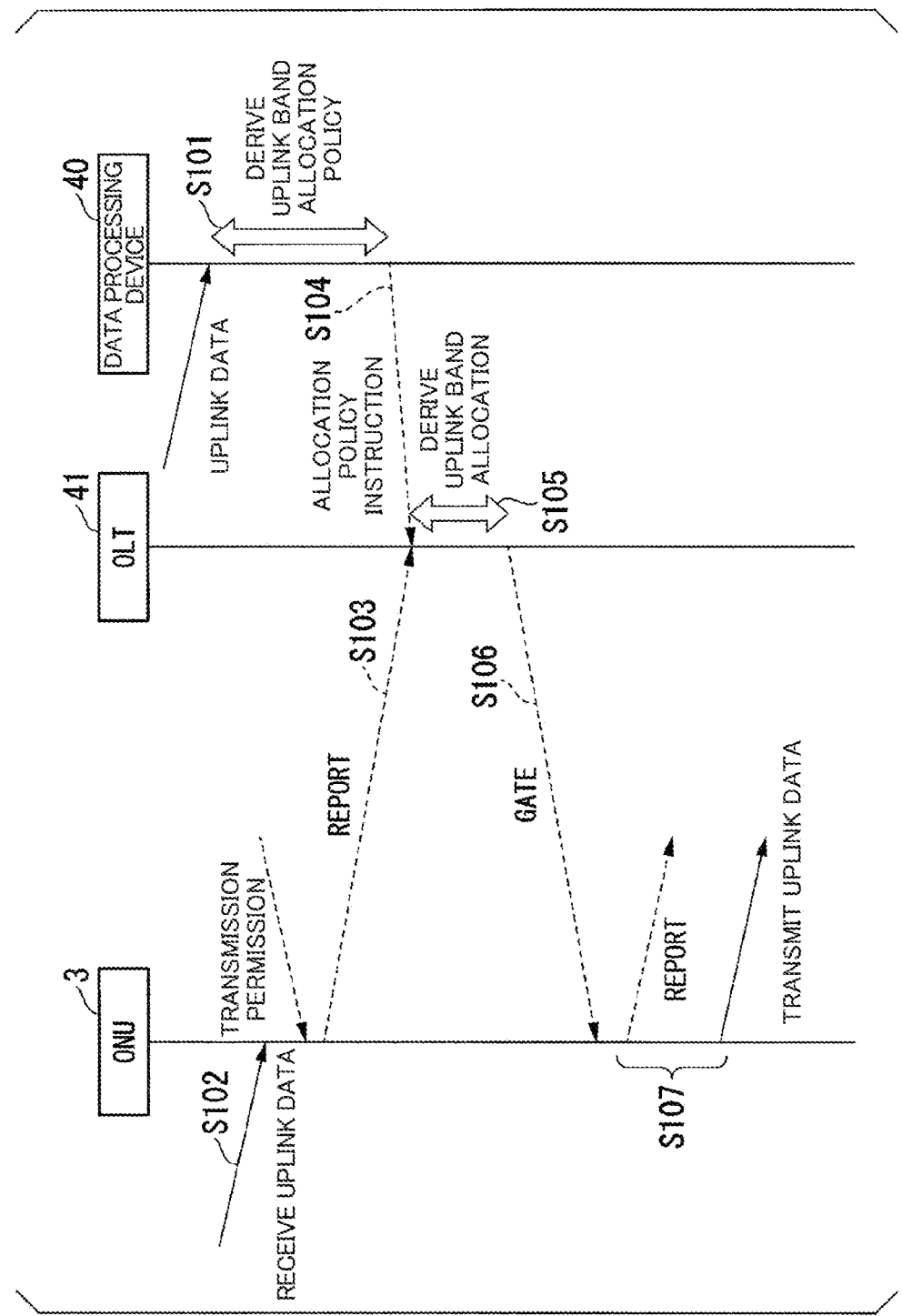
FIG. 4 is a diagram illustrating an operation example of the communication system according to the first embodiment.

FIG. 4 is a diagram illustrating an operation example (DBA function) of the communication system 1. The data processing device 40 executes predetermined data processing on the uplink data acquired from the MAC 413. The data processing device 40 determines the policy of band allocation of the uplink communication to be allocated to each ONU 3 on the basis of the result of data processing on the uplink data (step S101).

The ONU 3 temporarily accumulates the uplink data received from the lower-layer device 2 in the buffer memory 31 (step S102). The ONU 3 records the amount of the uplink data accumulated in the buffer memory 31 in a REPORT frame. The ONU 3 transmits the REPORT frame to the OLT 41. The OLT 41 extracts information indicating the amount of the uplink data accumulated in the ONU 3 from the received REPORT frame (step S103).

The data processing device 40 transmits information indicating the policy of band allocation of the uplink communication to the OLT 41 (step S104). The OLT 41 derives a band of the uplink communication to be allocated to each ONU 3 on the basis of the information indicating the amount of the uplink data accumulated in the ONU 3, information indicating a band used by another ONU 3, and the policy of the band allocation of the uplink communication. For example, the OLT 41 derives the transmission start time and the transmission permission amount of the uplink data of the ONU 3 (step S105).

The OLT 41 transmits a GATE frame including information indicating the derived band of the uplink communication to the ONU 3 (step S106). The ONU 3 transmits the uplink data at the instructed transmission start time on the basis of the information indicating the band of the uplink communication included in the received GATE frame. For next band allocation in the OLT 41, the ONU 3 may newly notify the OLT 41 of the amount of the uplink data accumulated in the buffer memory 31 (step S107).

The OLT 41 can derive the transmission start time and the transmission permission amount of the uplink data of each ONU 3 on the basis of the policy of the band allocation of the uplink communication determined by the data processing device 40 by the communication system 1 repeating the procedures of steps S101 to S107. The data processing device 40 may determine the policy of the band allocation of the uplink communication at each DBA period and may determine the policy at every multiple DBA period.

As described above, the communication system of the first embodiment includes a subscriber network unit such as an ONU and a communication device provided in the accommodating station 4. The subscriber network unit includes the acquisition unit 30. The acquisition unit 30 acquires uplink data from one or more lower-layer devices 2. The communication device includes the data processing unit 400, the policy determination unit 401, and the allocation control unit 410. The data processing unit 400 acquires uplink data from the subscriber network unit using the band of uplink communication. The data processing unit 400 executes data processing on the acquired uplink data. The policy determination unit 401 determines the policy of band allocation of the uplink communication on the basis of the result of the data processing. The allocation control unit 410 allocates the band of the uplink communication to the subscriber network unit on the basis of the policy. The allocation control unit 410 allocates the band of the uplink communication to the subscriber network unit on the basis of the amount of the uplink data accumulated in the subscriber network unit and the policy.

In this way, the communication system 1 of the first embodiment can suppress an increase in traffic volume in an optical line since the band of the uplink communication is flexibly allocated according to the result of the data processing executed by the data processing unit 400 and the amount of the uplink data accumulated in the lower-layer devices 2 or the ONU 3. The communication system 1 of the first embodiment can reduce a communication cost. The communication system 1 of the first embodiment can decrease the possibility that the number of lower-layer devices 2 that can be connected to the ONU 3 is limited.

Modified Example of First Embodiment

The lower-layer device 2 may dynamically change an occurrence symbol amount (S) of uplink data generated by the encoding circuit 21 without changing the communication speed (signal transmission speed) (T) of uplink data output from the buffer memory 22. The encoding circuit 21 changes the occurrence symbol amount of uplink data on the basis of the band allocation policy of uplink communication determined by the data processing device 40 regardless of the amount (accumulation amount) of the uplink data accumulated in the buffer memory 22. In this way, the communication system 1 can flexibly change the traffic volume of the uplink data in the section of an optical line between the ONU 3 and the OLT 41. A control signal between the data processing device 40 and the lower-layer device 2 and a control mechanism of the encoding circuit 21 etc. are not necessary. Therefore, the communication system 1 can use inexpensive lower-layer devices 2.

Second Embodiment

The second embodiment is different from the first embodiment in that the ONU 3 does not transmit a REPORT frame to the OLT 41. In the second embodiment, a difference from the first embodiment will be described.

Figure 5:
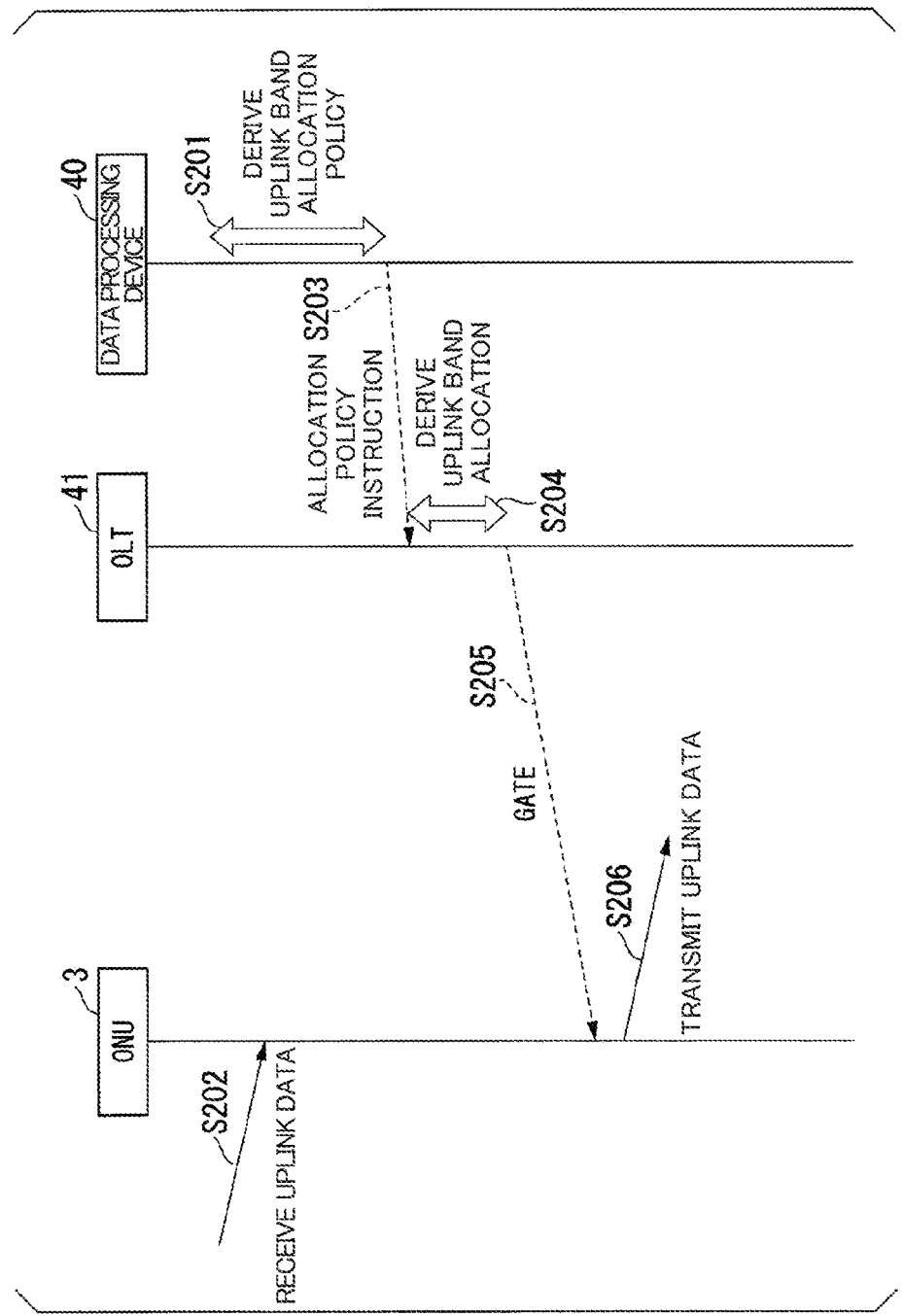
FIG. 5 is a diagram illustrating an operation example of a communication system according to a second embodiment.

FIG. 5 is a diagram illustrating an operation example (DBA function) of the communication system 1. The data processing device 40 executes data processing on uplink data. The data processing device 40 determines the policy of band allocation of uplink communication to be allocated to each ONU 3 on the basis of the result of data processing (step S201). The ONU 3 temporarily accumulates the received uplink data in the buffer memory 31 (step S202). The data processing device 40 transmits information indicating the derived policy of band allocation of uplink communication to the OLT 41 (step S203).

The OLT 41 derives the band of the uplink communication to be allocated to the ONU 3 having transmitted the REPORT frame on the basis of the policy of the band allocation of the uplink communication. For example, the OLT 41 derives the transmission start time and the transmission permission amount of the uplink data of the ONU 3 (step S204). The OLT 41 records the derived transmission start time and transmission permission amount of the uplink data in a GATE frame. The OLT 41 transmits the GATE frame to the ONU 3 (step S205). The ONU 3 transmits the uplink data to the OLT 41 at the instructed transmission start time using the received GATE frame (step S206).

The OLT 41 can derive the transmission start time and the transmission permission amount of the uplink data of each ONU 3 on the basis of the policy of the band allocation of the uplink communication determined by the data processing device 40 by the communication system 1 repeating the procedures of steps S201 to S206. The data processing device 40 may determine the policy of the band allocation of the uplink communication at each DBA period and may determine the policy at every multiple DBA period.

As described above, the communication system 1 of the second embodiment includes a subscriber network unit such as an ONU and a communication device provided in the accommodating station 4. The subscriber network unit includes the acquisition unit 30. The acquisition unit 30 acquires uplink data from one or more lower-layer devices 2. The communication device includes the data processing unit 400, the policy determination unit 401, and the allocation control unit 410. The data processing unit 400 acquires uplink data from the subscriber network unit using the band of uplink communication. The data processing unit 400 executes data processing on the acquired uplink data. The policy determination unit 401 determines the policy of band allocation of the uplink communication on the basis of the result of the data processing. The allocation control unit 410 allocates the band of the uplink communication to the subscriber network unit on the basis of the policy. The allocation control unit 410 may not allocate the band of the uplink communication to the subscriber network unit on the basis of the amount of the uplink data accumulated in the subscriber network unit.

In this way, the communication system 1 of the second embodiment can suppress increase in traffic volume in an optical line. In the second embodiment, the ONU 3 may not transmit the REPORT frame including information indicating the amount of accumulated uplink data to the OLT 41. In the communication system 1 of the second embodiment, since the ONU 3 does not transmit the REPORT frame, increase in the amount of uplink control signals can be suppressed as compared to the first embodiment, and the band of uplink communication can be used efficiently.

Third Embodiment

A third embodiment is different from the first and second embodiments in that the OLT 41 includes the data processing unit 400 and the policy determination unit 401. In the third embodiment, a difference from the first and second embodiments will be described.

Figure 6:
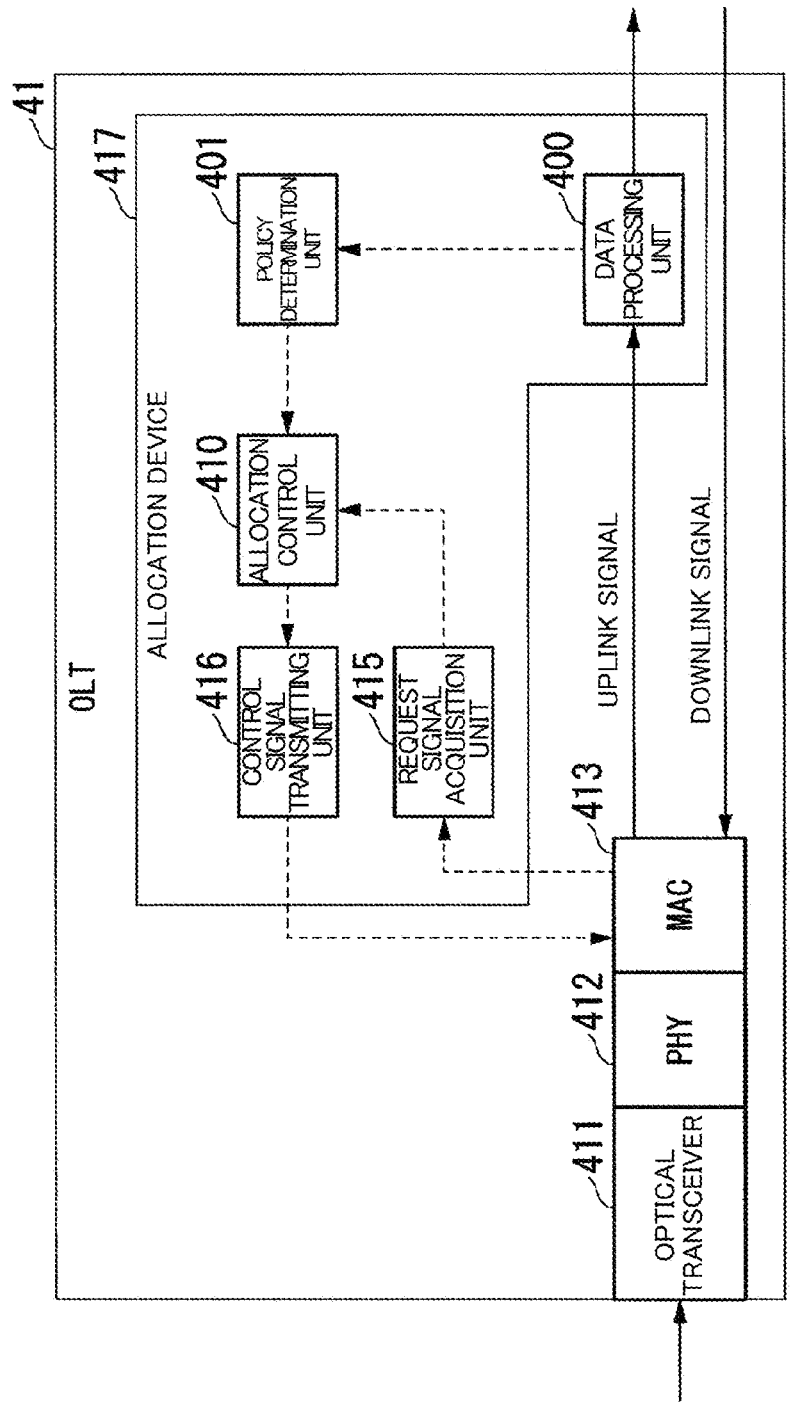
FIG. 6 is a diagram illustrating a configuration example of an OLT according to a third embodiment.

FIG. 6 is a diagram illustrating a configuration example of the OLT 41 (a device in an accommodating station building). The OLT 41 includes an optical transceiver 411, a PHY 412, an MAC 413, and an allocation device 417 (a data processing and a dynamic band allocation circuit). The allocation device 417 includes a data processing unit 400, a policy determination unit 401, an allocation control unit 410, a request signal acquisition unit 415, and a control signal transmitting unit 416.

The request signal acquisition unit 415 acquires a REPORT frame (a request signal) from the MAC 413. The allocation control unit 410 acquires information indicating the amount of the uplink data accumulated in the ONU 3 and information indicating the band used by another ONU 3 from the MAC 413.

The allocation control unit 410 acquires information indicating the determined policy of band allocation of the uplink communication from the policy determination unit 401. The allocation control unit 410 dynamically allocates the band of the uplink communication to each ONU 3 on the basis of the policy of the band allocation of the uplink communication. The allocation control unit 410 derives the band of the uplink communication to be allocated to the ONU 3 having transmitted the REPORT frame. For example, the allocation control unit 410 derives the transmission start time and the transmission permission amount of the uplink data from each ONU 3 to the OLT 41 on the basis of the policy of the band allocation of the uplink communication notified from the policy determination unit 401. The allocation control unit 410 outputs a GATE frame including information indicating the derived band of the uplink communication to the control signal transmitting unit 416. The control signal transmitting unit 416 outputs the GATE frame to the MAC 413. The MAC 413 outputs the GATE frame to the PHY 412. The PHY 412 outputs the GATE frame to the optical transceiver 411. The optical transceiver 411 transmits the GATE frame to the ONU 3 having transmitted the REPORT frame.

As described above, the communication system 1 of the third embodiment includes the OLT 41. The OLT 41 includes a data processing unit 400 and a policy determination unit 401. Due to this, the communication system 1 of the third embodiment can suppress increase in traffic volume in an optical line. In the third embodiment, since the data processing unit 400, the policy determination unit 401, and the allocation control unit 410 may be formed on the same substrate, an interface between the OLT 41 and the data processing device 40 is not necessary. The communication system 1 of the third embodiment is inexpensive as compared to the first embodiment. The communication system 1 of the third embodiment can shorten the communication time between the OLT 41 and the data processing device 40 and can realize a faster operation.

Fourth Embodiment

The fourth embodiment is different from the first to third embodiments in that the data processing unit 400, the policy determination unit 401, and the allocation control unit 410 are software components. In the fourth embodiment, a difference from the first to third embodiments will be described.

Figure 7:
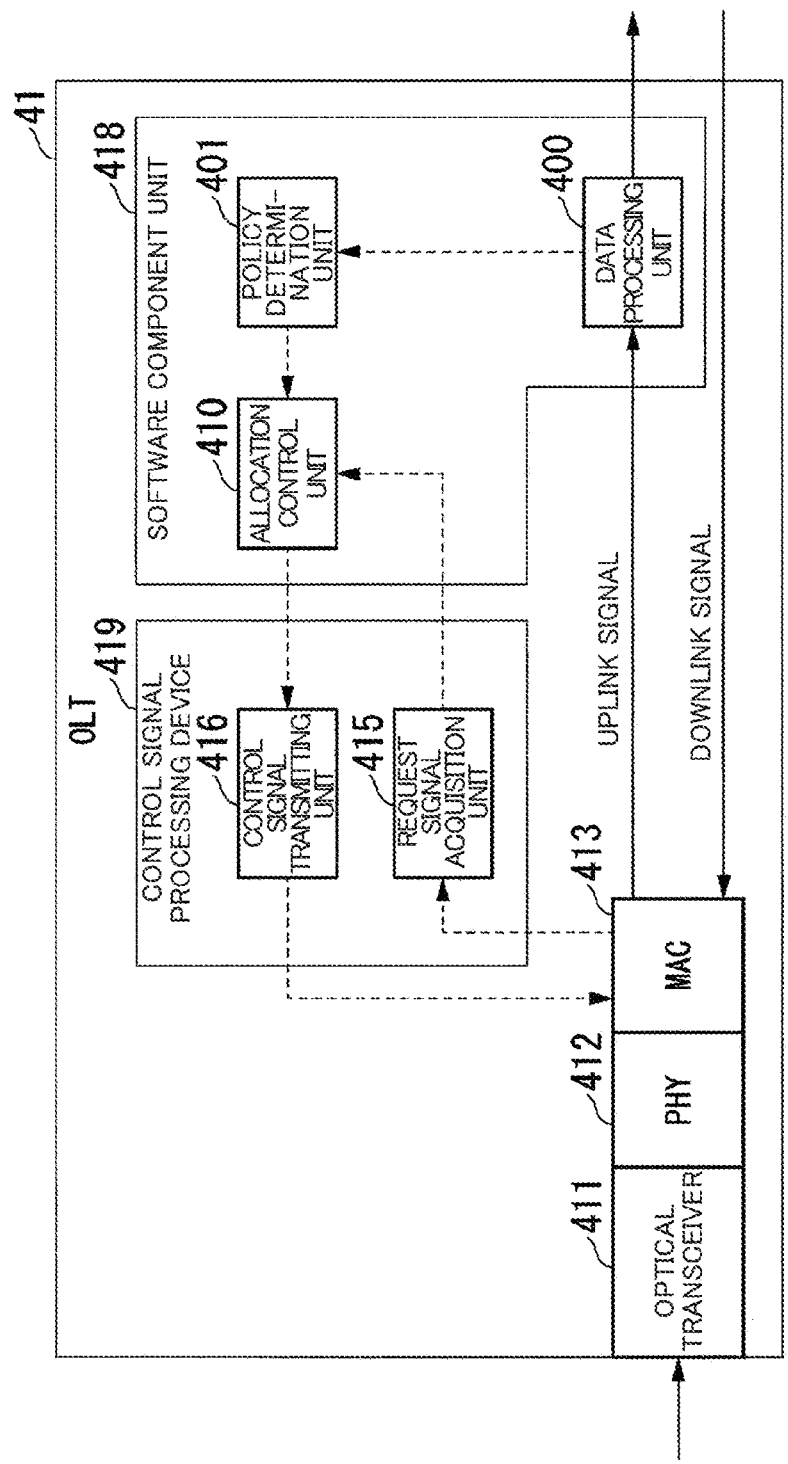
FIG. 7 is a diagram illustrating a configuration example of an OLT according to a fourth embodiment.

FIG. 7 is a diagram illustrating a configuration example of the OLT 41 (a device in an accommodating station building). Some or all of the functional units of the OLT 41 are realized as software component units when a processor such as a CPU (Central Processing Unit) executes a program stored in a storage unit. The storage unit is preferably a nonvolatile recording medium (non-transitory recording medium) such as a flash memory or a HDD (Hard Disk Drive), for example. The storage unit may include a volatile recording medium such as a RAM (Random Access Memory). The storage unit stores a program, for example.

The OLT 41 includes an optical transceiver 411, a PHY 412, a MAC 413, a software component unit 418, and a control signal processing device 419. The software component unit 418 includes a data processing unit 400, a policy determination unit 401, and an allocation control unit 410. The control signal processing device 419 includes a request signal acquisition unit 415 and a control signal transmitting unit 416.

The request signal acquisition unit 415 acquires a REPORT frame (a request signal) from the MAC 413. The allocation control unit 410 acquires information indicating the amount of the uplink data accumulated in the ONU 3 and information indicating the band used by another ONU 3 from the MAC 413.

The allocation control unit 410 acquires information indicating the determined policy of band allocation of the uplink communication from the policy determination unit 401. The allocation control unit 410 dynamically allocates the band of the uplink communication to each ONU 3 on the basis of the policy of band allocation of the uplink communication. The allocation control unit 410 derives the band of uplink communication to be allocated to the ONU 3 having transmitted the REPORT frame. For example, the allocation control unit 410 derives the transmission start time and the transmission permission amount of the uplink data from each ONU 3 to the OLT 41 on the basis of the policy of the band allocation of the uplink communication notified from the policy determination unit 401. The allocation control unit 410 outputs a GATE frame including information indicating the derived band of the uplink communication to the control signal transmitting unit 416.

The control signal transmitting unit 416 outputs the GATE frame to the MAC 413. The MAC 413 outputs the GATE frame to the PHY 412. The PHY 412 outputs the GATE frame to the optical transceiver 411. The optical transceiver 411 transmits the GATE frame to the ONU 3 having transmitted the REPORT frame.

As described above, a part of the communication system 1 of the fourth embodiment is realized using a software component. The software component unit 418 includes the data processing unit 400, the policy determination unit 401, and the allocation control unit 410. In this way, the communication system 1 of the fourth embodiment can suppress increase in traffic volume in an optical line. The communication system 1 of the fourth embodiment can flexibly change the functions at a high speed according to change in the software component unit 418.

Fifth Embodiment

The fifth embodiment is different from the first to fourth embodiments in that the communication system 1 suppresses increase in traffic volume in a higher-layer line which is the line between the accommodating station 4 and a higher-layer device (not illustrated). In the fifth embodiment, a difference from the first to fourth embodiments will be described.

Figure 8:
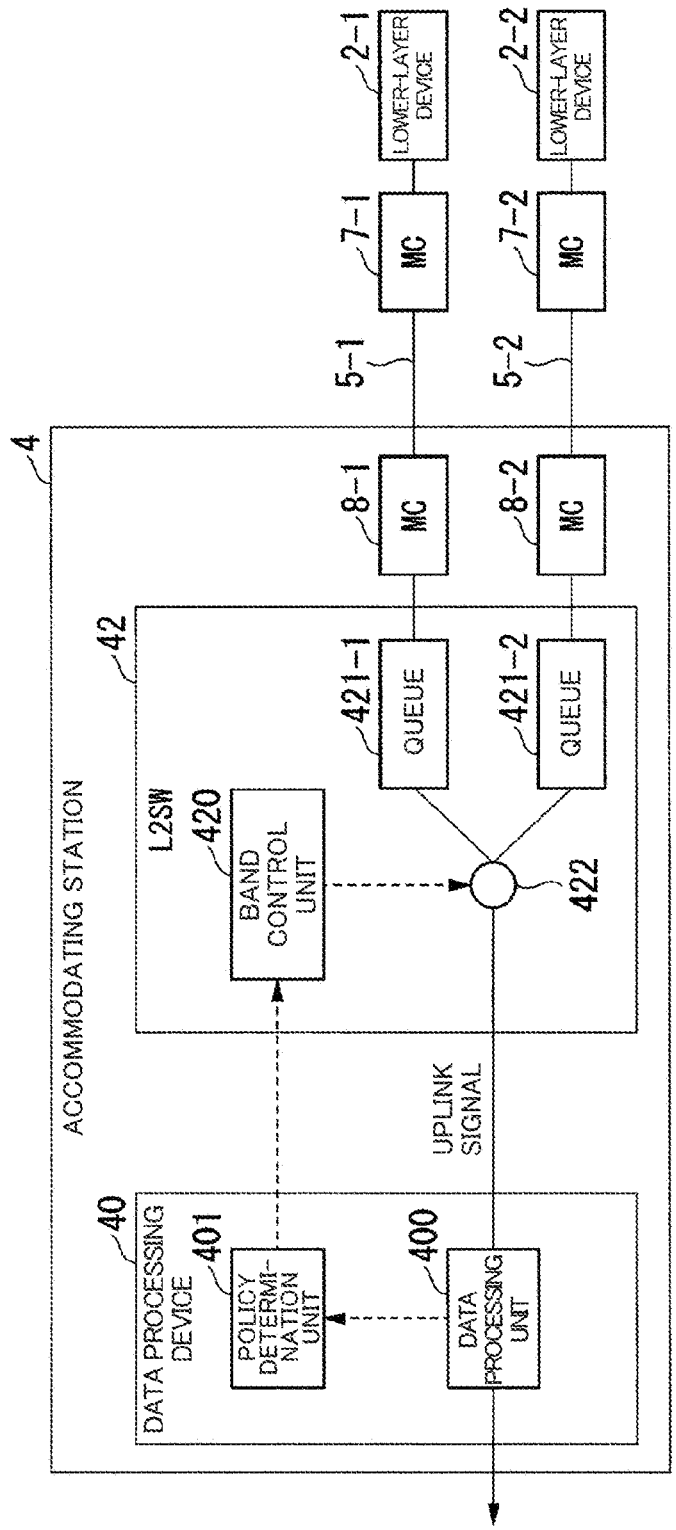
FIG. 8 is a diagram illustrating a configuration example of a communication system according to a fifth embodiment.
Figure 9:
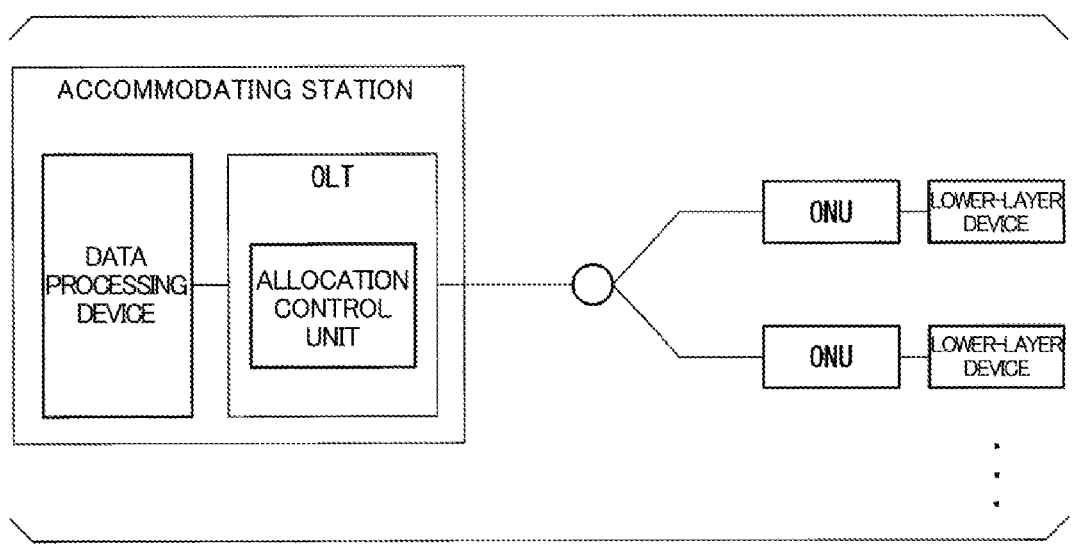
FIG. 9 is a diagram illustrating a configuration example of a conventional communication system.
Figure 10:
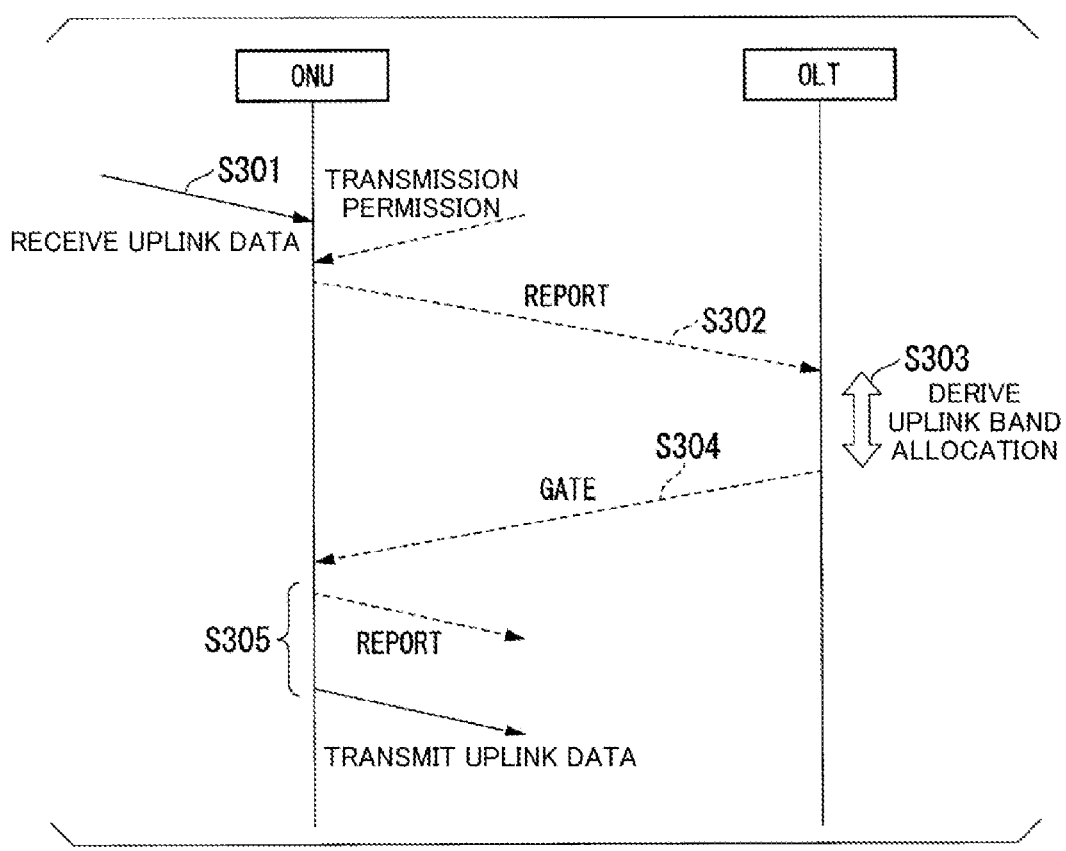
FIG. 10 is a diagram illustrating an operation example of the conventional communication system.

FIG. 8 is a diagram illustrating a configuration example of the communication system 1. The communication system 1 includes one or more lower-layer devices 2, an accommodating station 4, one or more optical fibers 5, and one or more MCs (media converters) 7. The optical fiber 5 may be a transmission path which uses wireless transmission or electric wires, for example. In the accommodating station 4, the data processing device 40, an L2SW (layer-2 switch) 42, and one or more MCs 8 are provided as station-side communication devices. The data processing device 40 includes a data processing unit 400 and a policy determination unit 401. The L2SW 42 includes a band control unit 420, a queue 421 for each lower-layer device 2, and a signal extraction unit 422.

Some or all of the functional units of the data processing device 40 and the L2SW 42 are realized using hardware such as an LSI or an ASIC, for example. Some or all of the functional units of the data processing device 40 and the L2SW 42 may be realized as software component units when a processor such as a CPU executes a program stored in a storage unit. The storage unit is preferably a nonvolatile recording medium (non-transitory recording medium) such as a flash memory or a HDD, for example. The storage unit may include a volatile recording medium such as a RAM. The storage unit stores a program, for example.

The MC 7 is a medium conversion device that converts the format of uplink data transmitted through a first transmission medium (for example, a transmission path using electric wires) to the format of uplink data transmitted through a second transmission medium (for example, a transmission path using optical fibers). The format of uplink data is the format of a frame of uplink data, for example. For example, the MC 7 converts the format of uplink data transmitted through a LAN (Local Area Network) cable between the lower-layer device 2 and the MC 7 to the format of uplink data transmitted through the optical fiber 5.

The MC 8 is a medium conversion device that converts the format of uplink data transmitted through the second transmission medium to the format of uplink data transmitted through a third transmission medium (for example, a transmission path in a substrate).

For example, the MC 8 converts the format of uplink data transmitted through the optical fiber 5 to the format of uplink data transmitted through the L2SW 42. The queue 421 acquires the conversion result of the uplink data transmitted from the lower-layer device 2 from the MC 8. The queue 421 temporarily accumulates the uplink data of which the format is converted.

The data processing unit 400 executes predetermined data processing on uplink data including non-structured data such as moving images, still images, and voices received from the ONU 3. The policy determination unit 401 determines the policy of band allocation of the uplink communication to be allocated to each ONU 3 on the basis of the result of the data processing on the uplink data. The policy determination unit 401 outputs information indicating the policy of the band allocation of the uplink communication to the band control unit 420.

The band control unit 420 instructs the signal extraction unit 422 on the time at which the uplink data is extracted from the queue 421 and the amount of extracted uplink data on the basis of the policy of the band allocation of the uplink communication. The signal extraction unit 422 extracts the accumulated uplink data from each queue 421 instructed from the band control unit 420. The signal extraction unit 422 outputs the uplink data to the data processing unit 400. The data processing unit 400 transmits the uplink data to a higher-layer device (not illustrated) on the cloud connected to a higher layer of the data processing unit 400.

As described above, the communication system 1 of the fifth embodiment includes the MC 7 (a medium conversion device) and a communication device provided in the accommodating station 4. The MC 7 acquires uplink data of the first format from one or more lower-layer devices 2. The MC 7 converts the acquired uplink data of the first format to uplink data of the second format. The communication device includes one or more MCs 8, the data processing unit 400, the policy determination unit 401, and the L2SW 42. The MC 8 acquires the uplink data of the second format from the MC 7 using the band of the uplink communication. The MC 8 converts the acquired uplink data of the second format to the uplink data of the third format. The MC 8 records the uplink data of the third format in the queue 421.

The data processing unit 400 executes data processing on the acquired uplink data of the third format. The policy determination unit 401 determines the policy of the band allocation of the uplink communication on the basis of the result of the data processing. The L2SW 42 acquires the acquired uplink data of the third format from the queue 421 on the basis of the policy. The L2SW 42 outputs the uplink data of the third format to the data processing unit 400.

In this way, since the communication system 1 of the fifth embodiment, flexibly allocates the band of the uplink communication according to the result of the data processing executed by the data processing device 40, it is possible to suppress increase in traffic volume on a layer higher than the L2SW 42. The communication system 1 of the first embodiment can reduce a communication cost. The communication system 1 of the first embodiment can decrease the possibility that the number of lower-layer devices 2 that can be connected to the ONU 3 is limited.

The communication device (OLT, data processing device, and the like) provided in an accommodating station of the communication system of the above-described embodiment may be realized as a computer. In this case, the communication device may be realized by recording a program for realizing the functions of the communication device on a computer-readable recording medium and allowing a computer system to read and execute the program recorded on the recording medium. The "computer system" mentioned herein includes an OS and hardware such as peripheral devices. The "computer-readable recording medium" refers to a portable medium such as a flexible disk, a magneto-optical disk, ROM, or CD-ROM, and a storage device such as a hard disk included in a computer system. The "computer-readable recording medium" may include a medium that dynamically retains the program for a short period like a communication line when the program is transmitted through a network such as the Internet and a communication circuit such as a telephone circuit and a medium that retains the program for a certain period like a volatile memory inside a computer system that serves as a server or a client in that case. The program may be one for realizing some of the above-described functions and may be one that can realize the above-described functions in combination with a program already recorded in the computer system, and may be one realized using a programmable logic device such as FPGA (Field Programmable Gate Array).

While the embodiment of the present invention has been described with reference to the drawings, a specific configuration is not limited to the embodiment and the present invention embraces changes in design and the like within the scope of the present invention.

INDUSTRIAL APPLICABILITY

The present invention can be applied to a communication system such as an optical subscriber communication system.

REFERENCE SIGNS LIST

1 Communication system
2 Lower-layer device
3 ONU
4 Accommodating station
5 Optical fiber
6 Optical coupler
7 MC
8 MC
20 Input image
21 Encoding circuit
22 Buffer memory
23 Transmitting unit
30 Acquisition unit
31 Buffer memory
40 Data processing device
41 OLT
400 Data processing unit
401 Policy determination unit
410 Allocation control unit
411 Optical transceiver
412 PHY
413 MAC
414 Allocation processing device
415 Request signal acquisition unit
416 Control signal transmitting unit
417 Allocation device
418 Software component unit
419 Control signal processing device
420 Band control unit
421 Queue
422 Signal extraction unit

The invention claimed is:

1. A communication system comprising a subscriber network unit and a communication device provided in an accommodating station, wherein the subscriber network unit includes:
a processor; and
a storage medium having computer program instructions stored thereon, when executed by the processor, perform to:
acquire uplink data from one or more lower-layer devices, and the communication device is configured to:
acquire the uplink data from the subscriber network unit using a band of uplink communication and execute data processing on the acquired uplink data;
determine a policy of band allocation of the uplink communication on the basis of the result of the data processing; and
allocate the band of the uplink communication to the subscriber network unit on the basis of the policy and an amount of the uplink data accumulated in the subscriber network unit.

2. The communication system according to claim 1, wherein the uplink data is transmitted via an optical line.

3. The communication system according to claim 1, wherein the uplink data is image data, and the data processing is image analysis processing.

4. The communication system according to claim 1, wherein the communication device is a subscriber line terminal.

5. A communication device provided in an accommodating station, comprising:
a processor; and
a storage medium having computer program instructions stored thereon, when executed by the processor, perform to:
acquire uplink data using a band of uplink communication from a subscriber network unit that acquires the uplink data from one or more lower-layer devices and executes data processing on the acquired uplink data;
determine a policy of band allocation of the uplink communication on the basis of the result of the data processing; and
allocate the band of the uplink communication to the subscriber network unit on the basis of the policy and an amount of the uplink data accumulated in the subscriber network unit.

6. A band allocation method executed by a communication system comprising a subscriber network unit and a communication device provided in an accommodating station, the band allocation method comprising: allowing the subscriber network unit to acquire uplink data from one or more lower-layer devices; allowing the communication device to acquire the uplink data from the subscriber network unit using a band of uplink communication and execute data processing on the acquired uplink data; allowing the communication device to determine a policy of band allocation of the uplink communication on the basis of the result of the data processing; and allowing the communication device to allocate the band of the uplink communication to the subscriber network unit on the basis of the policy and an amount of the uplink data accumulated in the subscriber network unit.

* * * * *